J. F. Mascher.
Stereoscopic Album
No. 3,291. Reissued Feb. 9, 1869
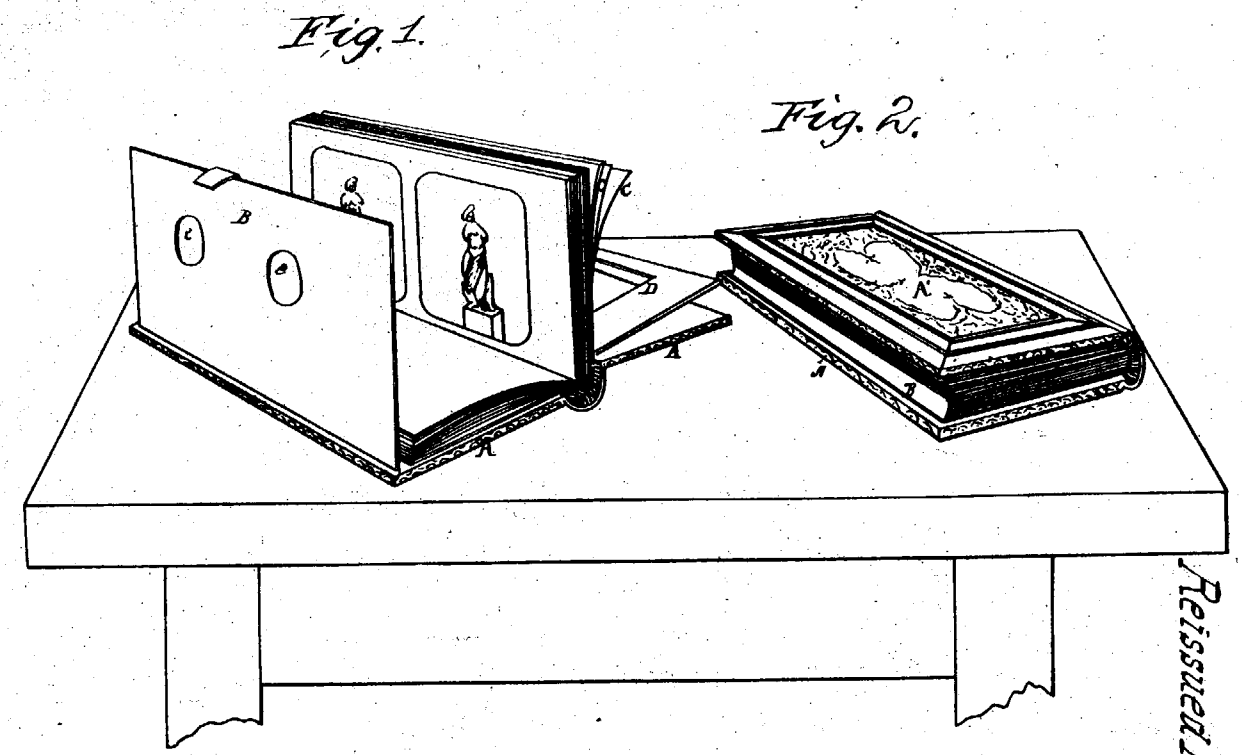
Witnesses
Geo Bradley
W A McKinley
Inventor.
Edgar Mascher Albany

UNITED STATES PATENT OFFICE.

ELIZA MASCHER, OF PHILADELPHIA, PENNSYLVANIA, ADMINISTRATRIX OF THE ESTATE OF JOHN F. MASCHER, DECEASED.

IMPROVEMENT IN BOOKS FOR PHOTOGRAPHS AND OTHER PICTURES.

Specification forming part of Letters Patent No. 9,611, dated March 8, 1853; extended seven years; Reissue No. 3,291, dated February 9, 1869.

*To all whom it may concern:*

Be it known that the late J. F. MASCHER, of Philadelphia, State of Pennsylvania, did, in his lifetime, invent an Improvement in Books for Photographs and Other Pictures, for which he obtained Letters Patent of the United States; and I do hereby declare that the following is a full, clear, and exact description of the construction and operation of the same, reference being had to the accompanying drawings, making part of this specification, in which—

Figure 1 is a perspective view showing the several parts of the book when open; Fig. 2, a like view of the book closed.

Like letters indicate like parts in both figures.

The nature of this said invention consists in binding together in the form or style of a book any suitable pictures of a convenient number, either pictures or perforated or skeleton leaves suitable for holding photographic pictures in combination with either blank or printed leaves. He also combined therewith a "supplementary lid" or "adjustable flap," containing a lens or lenses, and attached to one of the covers of the said book, so that when the book was opened any of the said pictures could be viewed either microscopically or stereoscopically, as the case might be, through the said lens or lenses. He used pictures printed upon leaves and perforated skeleton leaves, into which photographic or other removable pictures could be inserted.

In the drawings, A A′ are the covers of the book; B, the supplementary adjustable flap, containing a lens or lenses, *e e′*; C, the pictured leaves, interspersed with the blank or printed leaves.

Instead of pictured leaves, thick perforated or skeleton leaves, (shown at D,) composed of leather, paper, or pasteboard, or other suitable material adapted to receive and hold photographic or other pictured plates or sheets of any appropriate kind, might be used.

He also bound together promiscuously the printed leaves C with the perforated or skeleton or pictured leaves in the same manner in which books are generally bound, as shown in the figures. Clasps are attached for the purpose of keeping the book more securely closed. Near the outer edge, on the inner side of one of the covers of the book, he attached a supplementary adjustable flap, B, so that it could be readily raised up and held in a proper parallel position with any one of the pictured or skeleton leaves, as shown in Fig. 1, or folded inward between the lid to which it is attached and the mass or series of leaves adjoining on closing the book, as shown in Fig. 2.

When the pictures are designed for stereoscopic effect, two appropriate lenses, *e* and *e′*, are of course fixed in the flap B, as shown in the drawings: but when the apparatus is made or designed for simple microscopic effect one lens only is required for any particular single picture.

Photographic pictures are usually made use of upon paper or card in supplying the book; but various suitable materials, and pictures of any kind may be adapted and used for the purpose. If transparent or semi-transparent materials are substituted or interspersed, they must of course be held up singly before the lens or lenses in order to produce the intended effect.

Narrow strips of paper are sometimes bound into the back of the book, so that pictured sheets may at any time be attached thereto, after the manner of an ordinary scrap-book.

The interspersed leaves C are intended for either printed or written descriptions of the pictures, or autographs, &c.

Having thus described these improvements, what is claimed as the invention of J. F. MASCHER is—

1. Binding together in the form or style of a book perforated skeleton leaves adapted for holding photographic or other similar pictures, so arranged that said pictures may be inserted or removed at pleasure.

2. Binding together in the form or style of a book perforated or skeleton leaves adapted for holding removable photographic or other similar pictures, in combination with leaves containing printed matter.

3. Binding together in the form of a book skeleton leaves for holding removable photographic or other pictures, in combination with a movable flap containing lenses for viewing said pictures.

4. In combination with a series of photographic pictures bound together in a book, a supplementary flap containing stereoscopic lenses for viewing said pictures.

ELIZA MASCHER,
*Administratrix.*

Witnesses:
ANDREW J. HOLMAN,
GEORGE E. BUCKLEY.